United States Patent [19]
Takashima et al.

[11] 3,876,565
[45] Apr. 8, 1975

[54] ION EXCHANGER - POLYOLEFIN MEMBRANES

[75] Inventors: Naoichi Takashima; Mutsumi Nishidoi, both of Tokyo, Japan

[73] Assignee: Mitsubishi Petrochemical Company, Limited, Tokyo, Japan

[22] Filed: Aug. 27, 1973

[21] Appl. No.: 391,545

[30] Foreign Application Priority Data
Sept. 1, 1972  Japan.............................. 47-87666

[52] U.S. Cl.......... 260/2.1 R; 260/2.1 E; 260/2.2 R
[51] Int. Cl. ............................................. C08j 1/34
[58] Field of Search ...................... 260/2.2 R, 2.1 E

[56] References Cited
UNITED STATES PATENTS

| | | | |
|---|---|---|---|
| 2,681,319 | 6/1954 | Bodamer.............................. | 260/2.1 |
| 2,681,320 | 6/1954 | Bodamer.............................. | 260/2.2 |
| 3,627,703 | 12/1971 | Kojima et al. ....................... | 260/2.1 |

FOREIGN PATENTS OR APPLICATIONS
1,201,055   9/1965   Germany

*Primary Examiner*—Melvin Goldstein
*Attorney, Agent, or Firm*—Robert E. Burns; Emmanuel J. Lobato; Bruce L. Adams

[57] ABSTRACT

An ion exchanger comprises a polyolefin resin having a fine net-like structure dispersed uniformly throughout a shaped article such as a sheet and an ion exchange resin in powder form enveloped within each of the minute unit cells of the net-like structure. This ion exchanger can be produced by mixing the ion exchange resin in powder form and the polyolefin resin with a weight ratio of from 8:2 to 2.5:7.5, kneading and shaping the resulting mixture at a temperature at which the polyolefin resin softens and melts, yet the ion exchange resin retains its shape, and treating in hot water the article thus shaped.

8 Claims, 1 Drawing Figure

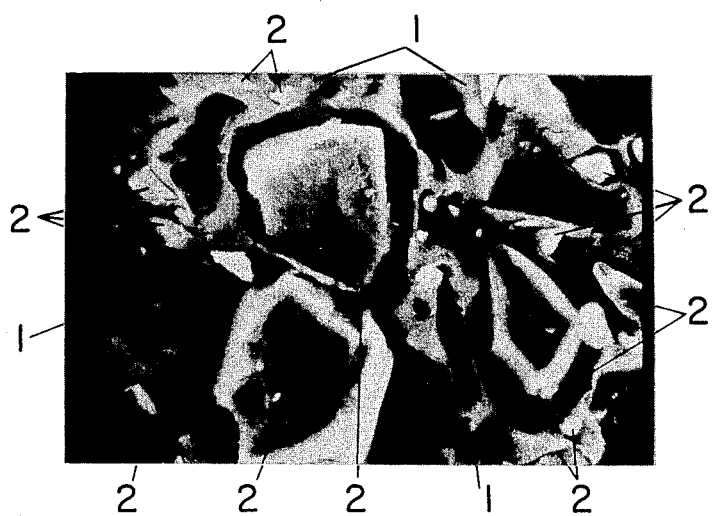

ION EXCHANGER - POLYOLEFIN MEMBRANES

BACKGROUND

This invention relates generally to ion exchangers and more particularly to a process for producing the same.

More specifically, the invention relates to new ion exchangers each possessing a thermoplastic resin matrix of a fine network structure and a resin having an ion-exchanging capacity within this network structure and to a process for producing these ion exchangers.

In general, the term ion exchangers is a generic term for materials having groups, that is, ion exchange groups dissociating and ionizing at a part of a matrix which is insoluble in water or an aqueous solution irrespective of their inorganic nature or organic nature. Since the exchange capacities per unit weight of most inorganic ion exchangers are exetremely low, almost all of the ion exchangers used industrially as ion exchangers are of the organic type irrespective of whether they are in particulate form or whether they are in film form.

The first of the properties required of a particulateform ion exchanger is a large exchange capacity. However, since properties such as heat resistance, chemical resistance, and wear resistance are required for utilization in industry, it is the general practice in the present state of the art in the production of such ion exchangers to prepare beforehand a base structure by causing styrene and divinylbenzene (hereinafter referred to by the abbreviation DVB) to undergo polycondensation and thereafter to introduce into the benzene nucleus a sulfonate group or an amine group.

Film-form ion exchangers, that is, so-called ion-exchange membranes are produced, in general, by applying a coating a solution of styrene and DVB on an organic or inorganic fabric-form material or support, heating this to cause the styrene and DVB to undergo polycondensation, and then introducing ion exchange groups similarly as set forth above.

Thus, much thought has been given to particulate ion-exchange resins and ion-exchange films, and products of some practical value are being developed, but these products cannot be said to be completely free of drawbacks.

For example, in a particulate ion-exchange resin, the concentration of the exchange groups and the strength of the product, the wear resistance, have a mutually contradictory relationship. When the strength is increased, that is, when the proportion of the cross linking agent (DVB) is increased, the degree of cross linking increases, and the strength increases, but, on the other hand, the number of benzene nuclei into which the ion exchange groups can be introduced decreases. Consequently, the ion exchange capacity per unit weight decreases. Conversely, when the degree of cross linking is lowered in order to increase the ion exchange capacity, the difference between the volumes of the ion exchange resin at the time of ion adsorption and that at the time of regeneration becomes large, whereby repetition of adsorption and desorption gives rise to a gradual pulverization of the ion exchange resin.

Accordingly, in view of these conditions, products of degrees of cross linking of from 8 to 12 percent are presently being produced.

While similar conditions pertain also to ion exchange membranes, a difference further exists between the rates of shrinkage of the support structure and the styrene polymer at the time of drying in an ion exchange film, whereby cracks or peeling occur, and pores of several tens of times the hydrated ion radius are produced. As a result, the effect of the electric field is no longer imparted to the ions in the water. That is, all ions assume a state wherein they can freely diffuse with the result that the membrane loses its selective permeability, which is a fundamental property of an ion exchange membrane.

Accordingly, it has been necessary to handle an ion exchange film generally in use at present always in a moist state. This has been a cause of great inconvenience in work such as fabrication of the film, assembly of the apparatus, and repair thereof.

Furthermore, a method of producing ion exchange membrane through the use of thermoplastic resin as a binder of ion exchange resin powder has been proposed. In this method, however, if the proportion of the thermoplastic resin is large, this thermoplastic resin will cover the surface of the ion exchange resin, and the exchange capacity will be small and insufficient for use. Accordingly, it is necessary to use a ratio of the ion exchange resin and the thermoplastic resin of 7:3 or higher.

However, in this case also, similarly as in the case of the above described ion exchange film, the strength of the film itself is low, and, moreover, the absolute necessity of avoiding drying creates extreme inconvenience.

SUMMARY

It is an object of this invention to overcome the above described difficulties and to provide strong ion exchangers of high ion exchange capacity and a process for producing the same.

Another object of the invention is to provide membrane and fibrous ion exchangers which can be dried without damage and can be freely handled.

Still another object of the invention is to provide ion exchangers having ion exchange groups of both anionic and cationic polarities.

According to this invention in one of its aspects, briefly summarized, there is provided a new ion exchanger comprising a polyolefin resin having a fine net-like structure dispersed uniformly throughout a shaped article and an ion exchange resin in powder form occluded within each of minute unit cells of the net-like structure.

According to this invention in another aspect thereof, there is provided a process for producing ion exchangers each as defined above, which comprises mixing an ion exchange resin in powder form and a polyolefin resin with a weight ratio of from 8:2 to 2.5:7.5, kneading and shaping the resulting mixture at a temperature at which the polyolefin resin softens and melts, yet the ion exchange resin retains its shape, and treating in hot water the article thus shaped.

The nature, utility, and further features of this invention will be apparent from the following detailed description beginning with a consideration of general aspects of the invention and concluding with specific examples of practice illustrating preferred embodiments of the invention.

ILLUSTRATIONS

The FIGURE is a photomicrograph of a magnification of 500 X of a section an ion exchanger produced by the process specified in Example 1 set forth hereinafter according to this invention.

DETAILED DESCRIPTION

The first important feature of an ion exchanger of this invention is that the thermoplastic resin forming the matrix has a fine net-like structure, and each of unit microcells holds a fine powder of an ion exchange resin. Because of this structure, not only is the ion exchanger of the invention pliable, but even if the ion exchange resin shrinks to a great degree at the time of drying, the polyolefin resin of the net-like structure forming the matrix retains its form without change, whereby cracking or breakage does not occur even in the dry state thereof, and the ion exchanger has pliability and is highly advantageous in handling.

That is, an ion exchanger of this invention has a structure wherein an ion exchange resin is included in a free state within a net-like structure of a polyolefin resin constituting a matrix. This structure is formed by an expansion in volume of the ion exchange resin mixed uniformly in the polyolefin resin, the volumetric expansion being caused by the hot water treatment. Accordingly, the powdered ion exchange resin to be used in this invention may be prepared by grinding an ion exchange resin sold on the market to a grain size of 100-mesh Tyler standard sieve or less. However, an ion exchange resin powder of low degree of cross linking, that is, large ion exchange capacity, and of high degree of dry-wet swelling is preferable.

This fact, itself, may be said to be a technical feature which is contradictory to general common knowledge wherein ion exchange resins to be dispersed within a resinous matrix be required to be as less swellable as possible in view of dimensional stability of the matrix. The term "degree of dry-wet swelling" as herein used designates the ratio of the volume of a resin in a completely dry state and the volume of the resin in a 100-percent water absorption state.

On one hand, the resin forming the matrix is stretched due to the expansion caused by the treatment with hot water, of the ion exchange resin powder contained therewithin at the temperature of the hot water and, as a result of this stretching, assumes a state ranging from a net-like state to a porous state, and the matrix retains this form even when the ion exchange resin powder shrinks because of cooling and drying and is in a state wherein the ion exchange resin powder is contained within the minute cells of this net-like structure.

This structural state can be achieved only by selecting a polyolefin resin for the resin to form the matrix, thoroughly mixing and forming at the temperature of softening and melting of the polyolefin resin and, moreover, at a temperature at which the ion exchange resin retains its shape, producing a shaped structure or article in a state wherein the ion exchange resin powder has been enveloped by the polyolefin resin, as it were, and immersing the article thus produced in hot water for a period of the order of from ten minutes to several tens of minutes.

Accordingly, the concept and process of this invention differs fundamentally from the process considered and attempted heretofore wherein a thermoplastic resin is used as a binder for ion exchange resin particles. This fundamental difference is also apparent from the fact that, while the ion exchange capacity of the shaped structure immediately after shaping in this invention is zero or almost zero, this capacity after the hot water treatment is the theoretical value of 100 percent or a value close thereto.

For the resin to be used in this invention for forming the matrix, any synthetic resin may be used provided that it is stretched by the expansion of the occluded ion exchange resin at a temperature of from 80° to 100°C to form a net-like structure and retains this state even after cooling. Resins to be used in actual practice, however, are preferably polyolefin resins, particularly polyethylene resins, polypropylene resins, and mixtures thereof.

The term "polyethylene resins" as herein used is intended to include low-density polyethylenes, high-density polyethylenes, copolymers of ethylene with other $\alpha$-olefins or with vinyl compounds containing at least 70 percent by weight of ethylene. Polypropylene resins similarly include copolymers of propylene with other $\alpha$-olefins or with vinyl compounds as well as homopolypropylenes.

The term "polyolefin resins" as herein used is intended to include homopolymers and copolymers of lower $\alpha$-olefins such as for example, ethylene, propylene, and butene-1, particularly resins homopolymers and copolymers thereof and copolymers of such $\alpha$-olefins and small quantities of other copolymerizable, ethylenically unsaturated monomers. Specific examples of such copolymerizable, ethylenically unsaturated monomers are acrylic and methacrylic acids and salts thereof, such as alkali metal salts, alkaline earth metal salts, and ammonium salts, and esters thereof with $C_1$ to $C_4$ monohydric and polyhydric alcohol; vinyl esters such as esters of $C_1$ to $C_2$ aliphatic and aromatic monocarboxylic acids; vinyl aromatics such as styrene, substituted styrenes having a substituent of the ring and/or the side chain, vinyl halides such as vinyl chloride and the like. These monomers may be present in the copolymer in quantities up to 5 mole percent.

Ion exchange resins are known to those skilled in the art. An ion exchange resin must be sufficiently fine in particle size, preferably of a size, at the most, such as to pass through a 100-mesh sieve. The lower limit of the particle size is of the order of few microns.

The proportions by weight of the ion exchange resin and the above described polyolefin resin for forming the matrix is from 2.5:7.5 to 8:2, preferably from 4:6 to 7.5:2.5. When the proportion of the ion exchange resin is less than 25 percent, the ion exchange capacity does not reappear even after the hot water treatment. On the other hand when the proportion is over 80 percent, the formability of the mixture is poor, and its durability with respect to its use as an ion exchanger is poor.

Furthermore, increased effectiveness can be attained by appropriately selecting the degree of dry-wet swelling of the ion exchange resin depending on the kind of polyolefin resin for forming the matrix. For example, in the case of a polypropylene, which is a homopolymer of propylene, a degree of dry-wet swelling in the range of from 1.3 to 2.2 is most preferable. In the case of low-density polyethylene, this range is preferably from 1.1 to 1.6, while in the case of high-density polyethylene, this range is preferably from 1.4 to 2.5.

However, the preferable range for a mixture of a polypropylene and a low-density polyethylene is from 1.1 to 2.0, while in the case of a blend of a polypropylene and approximately 10 percent of an elastomeric ethylene-propylene copolymer, the optimum value is around 1.5. Thus, there is some variation, but, in general, in the case of an ion exchange resin of a high degree of dry-wet swelling, the blending ratio is preferably on the low side, for example, from 2.5:7.5 to 7:2, while in the case of an ion exchange resin of low degree of dry-wet swelling, the blending ratio is preferably on the high side, for example, from 4:6 to 8:2.

For mixing and shaping the two components, any of the generally used mixing and shaping methods may applied directly, but an important point is that, in either of the mixing step and the shaping step, thorough kneading must be carried out at a temperature at which the resin for forming the matrix will soften and melt and at which, moreover, the ion exchange resin can retain its shape. By this process step, the ion exchange resin is dispersed uniformly throughout the polyolefin resin matrix, and, moreover, the ion exchange resin is rendered into a state wherein they are occluded by the polyoefin.

The resulting material in this state can be formed into almost any desired shaped structures or articles such as filaments, films or membranes, tubes, and particles. The shaped article thus formed is then subjected to hot water treatment, by which, for the first time, the polyolefin resin forming the matrix is first stretched at its outer side by the expansion of the ion exchange resin occluded therein to assume a net-like state. Then through the interstices of this structure, hot water infiltrates to cause the ion exchange resins in the interior to expand.

Thus, expansion of the ion exchange resin and stretching of the matrix are successively accomplished from the outer side, and the entire matrix assumes a fine net-like structure. In an ideal model, the article contains small particles of the ion exchange resin respectively within unit minute cells of the net-like structure. Accordingly, a temperature of the hot water above 80°C has been found to be most desirable. Furthermore, the treatment time must be varied suitably depending on the shape and size of the article, for example, from a number of minutes for a fibrous article to several hours for thick plates made up of particles.

An aqueous solution of 10 percent by weight of a water soluble salt such as a neutral salt may also be used as the "hot water."

In this invention, dual treatment of the shaped article with an aqueous acid and an aqueous alkali is not resorted to, which is in contradistinction to the prior art described in U.S. Pat. No. 3,627,703. The most preferable "hot water" is that which is free of any acid or alkali and which is neutral. Such neutral hot water can contain any neutral salt such as sodium chloride and sodium sulfate in such a quantity as to form up to 10% by weight aqueous solution of the salt.

The upper limit of the hot water treatment is within the range wherein the polyolefin resin matrix can retain its shape.

As is apparent from the foregoing considerations, the ion exchangers according to this invention have the unique feature of being readily formed into a wide variety of shaped and, at the same time, the highly desirable characteristic of not entailing deformation or breakage due to drying.

Still another advantageous feature of this invention is that it is possible to form an ion exchanger having ion exchange groups of both anionic and cationic polarities into a desired shape and, moreover, to select freely also the ratio of anion and cation exchange capacities.

In recent years, together with the progess of science and technology, there has risen a demand for the use of ion exchange resins of both anionic and cationic polarities in admixed state. For example, the greatest drawback of an ion exchange resin in powder form which is indispensable in salt removal filters for cooling water of a nuclear reactor is that the anion and cation exchange resins cohere and aggregate among themselves. In order to avoid this, a special dispersant (surface active agent) is being used, but I have found that by using exchangers of fine particulate state or fibrous state according to this invention, this problem also can be solved at once.

More specifically, by using a fiber having amphoteric ion exchange capacity prepared in accordance with the process of this invention by kneading a polyolefin resin, a strong-acid type, cation exchange resin in fine powder form, and a strong base type, ion exchange resin in fine powder form, shaping the resulting mixture into fibrous form, and then treating the resulting fiber with hot water, the objects of the ion exchange can be achieved without the use of a surface active agent. Furthermore, by selecting the proportions of the anion exchange resin and the cation exchange resin, the relative values of the negative and positive ion exchange capacities can be varied at will to suit the objects of the exchange.

An ion exchanger of this invention may have, in addition to the film and fibrous shapes described above, other shapes such as those of sheets, tubes, bars, rods, and others as desired. However, in view of the hot water treatment, shaped such as those of thin-wall articles, that is, films, fibers, and thin-wall tubes are preferable. Furthermore, it will be obvious that the ion exchangers of this invention can be used, not only as materials for ion exchange, but also as structural materials for general use such as fibers and films.

In order to indicate more fully the nature and utility of this invention, the following specific examples of practice constituting preferred embodiments of the invention are set forth, it being understood that these examples are presented as illustrative only and that they are not intended to limit the scope of the invention.

EXAMPLE 1

A strong-acid type, ion exchange resin of an exchange capacity of 5.0 meq/g. and a degree of dry-wet swelling of 1.2 in powder form passing through a 100-mesh Tyler standard sieve and a polypropylene of a melt index (MI) of 4 were mixed in specific proportions, as set forth in Table 1, to prepare corresponding specimens or samples. Each sample was kneaded at 200°C, and then extruded into a sheet of a thickness of 0.4 mm by means of an extruder. Each sample sheet thus obtained was treated for 30 minutes in hot water at 100°C. Certain characteristics of the resulting sheet samples were determined and found to be as indicated in Table 1.

Table 1

| Blend ratio by wt. (polypropylene/ion exchange resin) | Exchange* capacity recovery (%) | Exchange capacity (meq/g.) Before hot water treatment | Exchange capacity (meq/g.) After hot water treatment | Max. bend angle |
|---|---|---|---|---|
| 9 : 1 | 0 | 0 | 0 | 180° |
| 8 : 2 | 10 | 0 | 0.1 | 180° |
| 7 : 3 | 60 | 0 | 0.9 | 180° |
| 6 : 4 | 95 | 0 | 1.9 | 180° |
| 5 : 5 | 100 | 0 | 2.5 | 180° |
| 4 : 6 | 100 | 0.1 | 3.0 | 180° |
| 3 : 7 | 100 | 0.3 | 3.5 | 130° |
| 2 : 8 | 100 | 0.8 | 4.0 | 10° |
| 1 : 9 | could not be shaped | | | |

$$*\text{Exchange capacity recovery} = \frac{C_1}{C_2 \times R_b} \times 100$$

where:

$C_1$ is the exchange capacity (meq/g.) after shaping and hot water treatment;

$C_2$ is the exchange capacity (meq/g.) of the original ion exchange resin; and $R_b$ is the blend ratio The weight of the ion exchange resin in the dried state is taken as the standard.

A section of an ion exchanger prepared with a blend ratio by weight of the polypropylene and the ion exchange resin of 6:4 in accordance with the procedure of this Example 1 is shown magnified 500 times in the photomicrograph of FIGURE. This photomicrograph indicates that the ion exchange resin exists in the interiors of most of the minute cells (of various sizes) formed by the matrix of the polypropylene. From a close examination of this photomicrograph, it can be observed that most of the minute cells of the polypropylene have mutual communication passages and, as a whole, form a three-dimensional network structure.

EXAMPLE 2

Except for the use of a medium weak base type, ion exchange resin of an exchange capacity of 7.0 meq/g. and a degree of dry-wet swelling of 1.45 in powder form passing through a 275-mesh sieve, the procedure of Example 1 was followed to prepare the same number of sample sheets. The characteristics of these sheets were determined and found to be as set forth in Table 2.

Table 2

| Blend ratio by wt. (polypropylene/ion exchange resin) | Exchange capacity recovery (%) | Exchange capacity (meq/g.) Before hot water treatment | Exchange capacity (meq/g.) After hot water treatment | Max. bend angle |
|---|---|---|---|---|
| 9 : 1 | 0 | 0 | 0 | 180° |
| 8 : 2 | 20 | 0 | 0.3 | 180° |
| 7 : 3 | 80 | 0 | 1.9 | 180° |
| 6 : 4 | 100 | 0 | 2.8 | 180° |
| 5 : 5 | 100 | 0 | 3.5 | 180° |
| 4 : 6 | 100 | 0.2 | 4.2 | 180° |
| 3 : 7 | 100 | 0.4 | 4.9 | 180° |
| 2 : 8 | 100 | 1.0 | 5.6 | 20° |
| 1 : 9 | could not be shaped | | | |

EXAMPLE 3

A strong acid type ion exchange resin of an exchange group capacity of 5.0 meq/g. and a degree of dry-wet swelling of 1.2 in powder form passing through a 100-mesh sieve was added with different blend ratios, as indicated in Table 3, to a low-density polyethylene (PE) of a MI of 8 and to a high-density polyethylene of a MI of 6 to prepare two sets of nine samples each. Each sample was thoroughly kneaded and then formed into of film of 0.5 mm thickness by pressing for 4 minutes at 200°C with a press under a pressure of 30 atmospheres. Each sample sheet was then treated for 30 minutes in hot water at 100°C. The characteristics of the sample sheets thus produced are shown in Table 3.

Table 3

| Blend ratio PE/ion exchange resin | Low-density polyethylene | | | High-density polyethylene | | |
|---|---|---|---|---|---|---|
| | Exchange capacity recovery | Exchange capacity | Max. bend angle | Exchange capacity receovery | Exchange capacity | Max. bend angle |
| 9 : 1 | 0 | 0 | 180° | 0 | 0 | 180° |
| 8 : 2 | 10 | 0.1 | 180° | 12 | 0.1 | 180° |
| 7 : 3 | 50 | 0.8 | 180° | 53 | 0.8 | 180° |
| 6 : 4 | 95 | 1.9 | 180° | 100 | 2.0 | 180° |
| 5 : 5 | 100 | 2.5 | 180° | 100 | 2.5 | 180° |
| 4 : 6 | 100 | 3.0 | 180° | 100 | 3.0 | 180° |
| 3 : 7 | 100 | 3.5 | 160° | 100 | 3.5 | 180° |
| 2 : 8 | 100 | 4.0 | 10° | 100 | 4.0 | 20° |
| 1 : 9 | could not be shaped | | | could not be shaped | | |

EXAMPLE 4

A medium weak basic ion exchange resin of an exchange group capacity 7.0 meg/g. and a degree of dry-wet swelling of 1.45 in powder form passing through a 100-mesh sieve was added with different blend ratios, as indicated in Table 4, to a low-density polyethylene (PE) of a MI of 8 and to a high-density polyethylene of a MI of 6 to prepare two sets of nine samples each. Each sample mixture was thoroughly kneaded and then formed into a film of 0.5 mm thickness by pressing for 4 minutes at 200°C with a press under a pressure of 30 atmospheres. Each sample was then treated for 30 minutes in hot water at 100°C. The characteristics of the sample sheets thus produced are set forth in Table 4.

Table 4

| Blend ratio PE/ion exchange resin | Low-density polyethylene | | | High-density polyethylene | | |
|---|---|---|---|---|---|---|
| | Exchange capacity recovery | Exchange capacity | Max. bend angle | Exchange capacity recovery | Exchange capacity | Max. bend angle |
| 9 : 1 | 0 | 0 | 180° | 0 | 0 | 180° |
| 8 : 2 | 10 | 0.1 | 180° | 15 | 0.2 | 180° |
| 7 : 3 | 50 | 1.0 | 180° | 75 | 1.6 | 180° |
| 6 : 4 | 96 | 2.7 | 180° | 100 | 2.8 | 180° |
| 5 : 5 | 100 | 3.5 | 180° | 100 | 3.5 | 180° |
| 4 : 6 | 100 | 4.2 | 180° | 100 | 4.2 | 180° |
| 3 : 7 | 100 | 4.9 | 150° | 100 | 4.9 | 180° |
| 2 : 8 | 100 | 5.6 | 10° | 100 | 5.6 | 20° |
| 1 : 9 | could not be shaped | | | could not be shaped | | |

EXAMPLE 5

A strong acid type ion exchange resin of an exchange capacity of 4.8 meq/g. and a degree of dry-wet swelling of 1.1 and an ethylene-propylene copolymer of an ethylene content of 12 percent by weight of a MI of 2 in a blend ratio of 1:1 were kneaded. The resulting mixture was extruded by means of an extruder at 220°C into a film of 0.4 mm thickness, which was immersed for 30 minutes in hot water at 80°C thereby to produce an ion exchange film.

The results of certain measurements on this film were an ion exchange capacity of 2.4 meq/g., a Mullen bursting strength of 100 kg/cm², a maximum bend test angle of 180°, elongation at rupture in tension of 6 percent.

EXAMPLE 6

30 grams of a strongly acidic ion exchange resin powder of less than 100-mesh size (passing through a 100-mesh sieve) of an exchange capacity of 4.8 meq/g., 30 grams of a strongly basic ion exchange resin powder of an exchange capacity of 3.2 meq/g., and 40 grams of a polypropylene powder were kneaded together. The resulting mixture was pressed for 4 minutes at 200°C with a press at 30 atmospheres to form a film of 0.5 mm thickness, which was treated for 30 minutes in hot water at 100°C. The reproducibility of the exchange capacity inherently possessed by the blended ion exchange resin was measured and found to be 100 percent. Moreover, an amphoteric ion exchanger of extremely pliable nature which could be bent and folded through 180° in a perfectly dry state without occurrence of cracks was obtained.

Table 5

| Characteristic | Measured values | | Remarks |
|---|---|---|---|
| | Before hot water treatment | After hot water treatment | |
| Cation exchange capacity | 0 meq/g | 1.5 meq/g | Theoretical value 1.5 meq/g |
| Anion exchange capacity | 0 meq/g | 1.0 meq/g | Theoretical value 1.0 meq/g |
| Max. bend test angle | 80° | 180° | |
| Elongation at tensile rupture | <1% | 6% | |

*Theoretical value = ion exchange resin exchange capacity = capacity × $\frac{30}{100}$

EXAMPLE 7

30 grams of a strongly acidic cation exchange resin of an exchange capacity of 4.8 meq/g. in powder form passing through a 275-mesh sieve, 30 grams of a strongly basic anion exchange resin of an exchange capacity of 3.2 meq/g., and 40 grams of polypropylene powder were kneaded together. The resulting mixture was then extruded at 220°C and a speed of 3 meters/minute into a fibrous structure of a diameter of 1 mm. This fibrous structure was immersed for 3 minutes in hot water at 100°C, whereupon an ambipolar ion exchanger of fibrous character having ion exchange capacity and pliability was obtained.

Table 6

| Characteristic | Measured values | | Remarks |
|---|---|---|---|
| | Before hot water treatment | After hot water treatment | |
| Positive ion exchange capacity | 0 | 1.5 meq/g | Theoretical value 1.5 meq/g |
| Negative ion exchange capacity | 0 | 1.0 meq/g | Theoretical value 1.0 meq/g |
| Max. bend test angle | 20 – 30° | 180° | |
| Elongation of tensile rupture | <1% | 6% | |

What we claim is:

1. A process for producing ion exchangers which comprise mixing an ion exchange resin in powder form and a polyolefin resin in a weight ratio of from 8:2 to 2.5:7.5, kneading and shaping the resulting mixture at a temperature at which the polyolefin resin softens and melts, and at which the ion exchange resin retains its shape, and subjecting the article thus shaped to treatment in hot water at a temperature from 80°C to the softening point of the shaped article for a period of from a few minutes to several hours.

2. A process for producing ion exchangers as claimed in claim 1 in which the ion exchange resin in powder form has a particle size passing through a 100-mesh Tyler standard sieve.

3. A process for producing ion exchangers as claimed in claim 1 in which the polyolefin resin is a polymer of an α-olefin selected from the group consisting ethylene, propylene, and butene-1.

4. A process for producing ion exchangers as claimed in claim 3 in which the polyolefin resin is polyethylene.

5. A process for producing ion exchangers as claimed in claim 1 in which the hot water is substantially neutral.

6. A process for producing ion exchangers as claimed in claim 1 in which the article thus shaped is a thin-walled article.

7. A process according to claim 1 wherein said polyolefin resin is selected from the group consisting of α-olefin homopolymers of ethylene, propylene and butene-1 and copolymers of not less than 70 wt percent of said α-olefins with the remaining part of a vinyl monomer.

8. A process for producing ion exchangers according to claim 1 comprising a polyolefin resin having a fine net-like structure dispersed uniformly throughout a shaped article and an ion exchange resin in powder form enveloped within each of minute cells of said net-like structure, which process comprises mixing an ion exchange resin having a swelling property in hot water in powder form and a polyolefin resin having a softening point lower than that of said ion exchange resin and stretchability at a temperature of 80° - 100°C. with a weight ratio of from 8:2 to 2.5:7.5, kneading and shaping the resulting mixture at a temperature at which the polyolefin resin softens and melts, and at which the ion exchange resin retains its shape, and subjecting the article thus shaped to treatment in hot, substantially neutral water at a temperature of from 80°C to a temperature at which the shaped structure begins to undergo remarkable deformation for a period of from a few minutes to several hours.

* * * * *